(No Model.)
J. C. WILSON.
POLARIZED RELAY.
No. 402,639. Patented May 7, 1889.
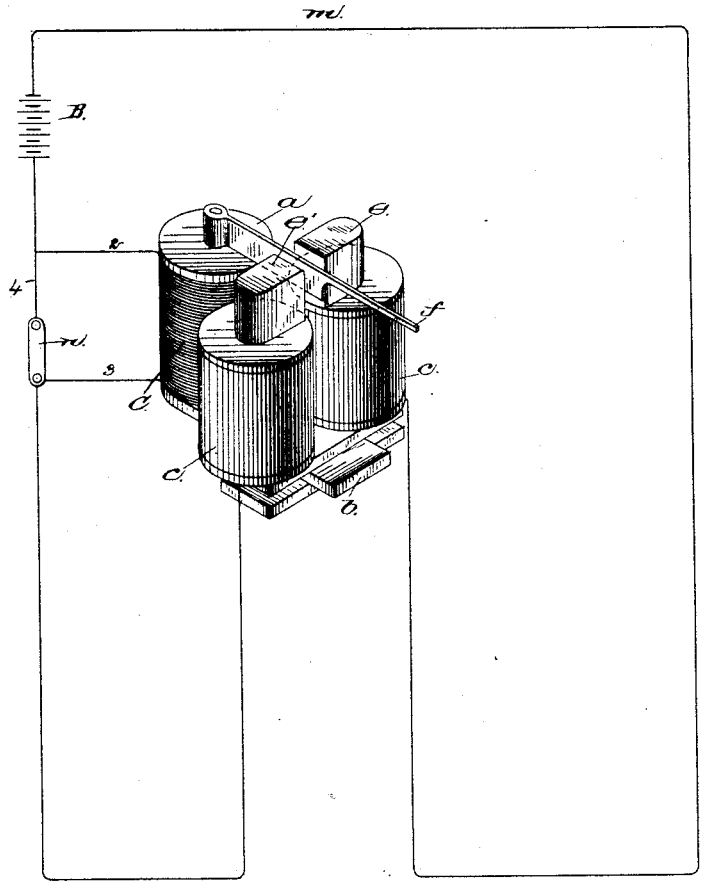
Witnesses.
Fred L. Emery.
John F. C. Prescott.
Inventor
John C. Wilson.
by Crosby & Gregory attys.

United States Patent Office.

JOHN C. WILSON, OF BOSTON, MASSACHUSETTS.

POLARIZED RELAY.

SPECIFICATION forming part of Letters Patent No. 402,639, dated May 7, 1889.

Application filed November 9, 1886. Serial No. 218,394. (No model.)

*To all whom it may concern:*

Be it known that I, JOHN C. WILSON, of Boston, county of Suffolk, and State of Massachusetts, have invented an Improvement in Polarized Relays, of which the following description, in connection with the accompanying drawings, is a specification, like letters on the drawings representing like parts.

In polarized relays of the Siemens class, now commonly used, the strength of the permanent magnet gradually decreases by continual use and in a short time so impairs the efficiency of the relay as to render it practically useless.

This invention has for its object to provide efficient means for supplying the permanent magnet with sufficient magnetism to compensate for the gradual loss, that it may always maintain substantially its normal strength.

In carrying out this invention I place or wind an inductive coil upon one arm of the permanent magnet and connect the terminals of the said coil with a battery, or within an electric circuit including a battery, preferably with a main electric circuit in which the polarized relay is placed, and as the current required to keep up the normal strength of a permanent magnet is very little the inductive coil wound upon it may be normally shunted out to be introduced when desired by a suitable switch or automatic circuit-changing device of any well-known construction.

The drawing shows in perspective a polarized relay having an inductive coil connected in an electric circuit.

The permanent magnet, consisting of a bar of steel bent substantially at right angles to present two arms, $a$ $b$, an electro-magnet, $c$, the heel-piece of which is placed upon the arm $b$ of the permanent magnet, the pole-pieces $e$ $e'$, and pivoted tongue $f$ are all, as usual in polarized relays, of the class commonly termed the "Siemens relay."

In practice the strength of the permanent magnet forming a part of the relay decreases, and to compensate for this gradual loss I have provided one arm, as $a$, of the permanent magnet with an inductive coil, C, either wound thereon or wound upon a spool, and the latter placed thereon. The terminals 2 3 of the inductive coil are connected with an electric circuit, $m$, including a battery, B. As the charge it is desired to give to the permanent magnet to compensate for the gradual loss of magnetism referred to is very small, the inductive coil C is normally shunted out by the wire 4, and the circuit-changing device herein shown has a switch, $n$. When the switch $n$ is open, the current passes through the inductive coil C, and thereby charges the permanent magnet.

By the use of the inductive coil it will be seen that the gradual loss of magnetism will be compensated for to such an extent as to normally keep the permanent magnet of substantially the same strength.

I do not herein claim a permanently-magnetized needle, one end or portion of which moves in the field of an inductive coil and the opposite end is responsive to electro-magnetic devices.

I claim—

The polarized relay herein described, comprising the permanently-magnetized bent bar $a$ $b$, the electro-magnet $c$, placed in magnetic contact with the said permanently-magnetized bar and having its coils in the line-wire $m$, the armature $f$, pivoted to the arm $a$ of said permanently-magnetized bar and vibrating between the pole-pieces $e$ $e'$ of said electro-magnet $c$, combined with the auxiliary inductive coil C, placed or wound upon the arm $a$ of said permanently-magnetized bar, and connected with the line-wire $m$ and the switch $n$, for shunting out the said coil C, all substantially as and for the purpose specified.

In testimony whereof I have signed my name to this specification in the presence of two subscribing witnesses.

JOHN C. WILSON.

Witnesses:
 BERNICE J. NOYES,
 FRED L. EMENS.